July 25, 1961

E. W. LUNDAHL 2,993,991

COMMUNICATION DEVICE

Filed Sept. 21, 1959

Inventor
ERNEST W. LUNDAHL

By Soans, Anderson, Luedeka & Fitch
Attys

2,993,991
COMMUNICATION DEVICE

Ernest W. Lundahl, 685 11th St., Idaho Falls, Idaho

Filed Sept. 21, 1959, Ser. No. 841,158
2 Claims. (Cl. 250—20)

Figure 1:
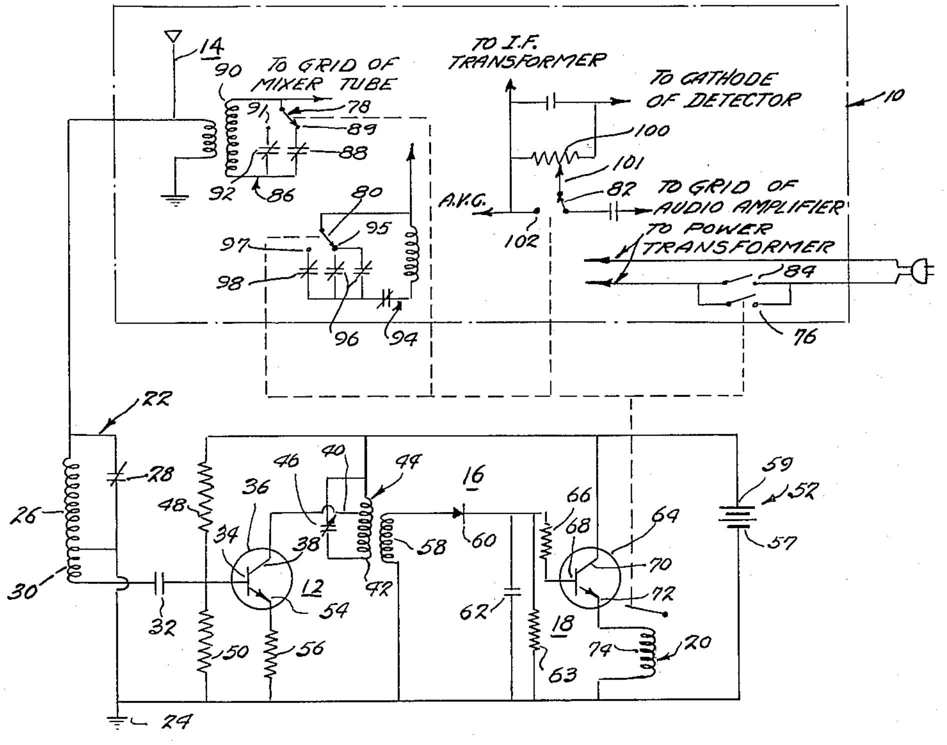

The present invention relates to communication devices and more particularly to an emergency remote control circuit for a communication circuit.

In the event of a national emergency it is desirable to quickly alert the populace and instruct them on the proper course of action. Various devices have been suggested for accomplishing this, such as centrally located loud speakers and special radio receivers. Centrally located loud speakers have a disadvantage in that a sizeable portion of the populace may not hear the emergency messages because of their location in respect to the speakers and/or because of intervening structures.

In connection with the utilizing of special radios, besides requiring the populace to purchase extra radios, it would be necessary to constantly maintain such radios in an activated condition, since national emergencies may occur when least expected. This is not too practical, because a continually operated radio would be a constant expense and, in addition, it is not desirable to have a radio constantly blaring.

Emergency devices have been provided to disconnect the speaker from the receiving circuit of a radio, and to reconnect the speaker to the radio circuit during a national emergency. However, such a radio has a disadvantage in that the radio, besides being continually in operation, cannot be used as a standard radio because it must be constantly tuned to the wave length of the emergency signal.

Accordingly, an object of the present invention is the provision of a circuit which is connected to a communication device so as to activate the device, and to tune the device to an emergency wave length when an emergency signal is received. Another object is the provision of a remote control circuit which, when a predetermined signal is received, activates a communication receiver, tunes the receiver to a given wave length, and tunes the volume of the receiver to a maximum. A further object is the provision of an emergency remote control device for a communication receiver which is inexpensive in operation and is easily adapted to existing communication receivers.

Further objects and advantages of the present invention will become apparent by reference to the following description and accompanying drawings.

Figure 2:
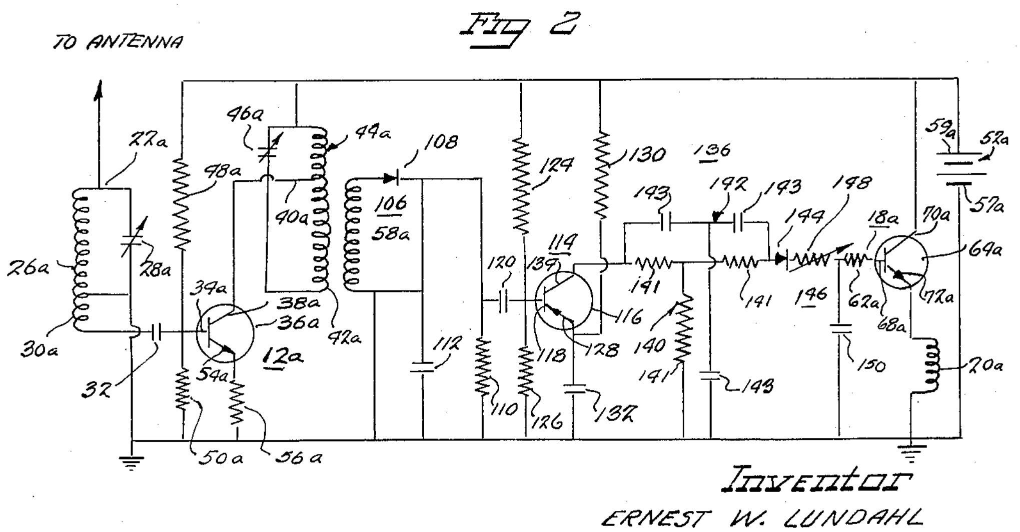

In the drawings:

FIGURE 1 is a schematic circuit diagram of an emergency remote control circuit showing various features of the present invention, the remote control circuit being connected to a conventional radio receiver circuit; and FIGURE 2 is a schematic circuit diagram of another embodiment of the emergency remote control circuit.

An emergency remote control circuit in accordance with the present invention is connected to a conventional communication receiver so as to activate and tune the receiver to a predetermined wave length in response to an emergency signal. The remote control circuit includes an amplifier which is tuned to the wave length of the predetermined signal, and a relay which is operated by the output signal from the amplifier. The relay is provided with at least two contacts, one contact being connected across the on-off switch of the receiver so as to short circuit the switch when the relay is energized. The second contact is connected into the input amplifier of the receiver so as to tune the input amplifier to the wave length of the predetermined signal when the relay is energized.

More particularly, the remote control circuit shown in the drawings is connected to a conventional superheterodyne radio circuit which is indicated by the reference numeral 10. Since superheterodyne radio circuits are well known, only the parts of the circuit 10 that are controlled are detailed in the drawings.

It should be realized that the emergency signal may be either transmitted over a wave length which is a standard broadcasting wave length, or transmitted over a wave length which is only used in emergencies. The remote control circuit shown in FIGURE 1 is utilized to control the radio circuit 10 when the emergency signal is transmitted on a wave length which is only used in emergencies.

The remote control circuit includes an input amplifier stage 12 which is connected to the antenna 14 of the radio circuit 10 and which is tuned to the emergency wave length, a rectifier stage 16 for rectifying the emergency signal, and a direct current amplifier stage 18 for amplifying the rectified signal in order to operate a relay 20.

As shown in FIGURE 1, the input amplifier stage 12 includes a tank circuit 22 which is connected between the antenna 14 and ground 24. The tank circuit 22 includes a coil or inductor 26 connected in parallel with an adjustable capacitor 28 which is adjusted to tune the tank circuit 22 to the wave length of the emergency signal. The signal in the tank circuit 22 is sampled by a second coil or inductor 30, which is mutually coupled with the inductor 26, and the sampled signal is fed through a coupling capacitor 32 to the base 34 of an n-p-n transistor 36. The transistor 36 is not connected directly to the tank circuit 22 because of the low input impedance of a transistor.

The collector 38 of the transistor 36 is connected to the center connection 40 of the primary winding 42 of an auto-transformer 44. The primary of the auto-transformer 44 is tuned to the emergency wave length by an adjustable capacitor 46 connected across the primary winding 42. The auto-transformer 44 provides a proper impedance match between the high impedance of a tuned circuit and the relatively low impedance of a collector circuit of a transistor.

The transistor 36 is biased by connecting the base 34 to a voltage divider which includes a pair of series connected resistors 48 and 50 connected across a battery 52. The emitter 54 of the transistor 36 is connected through a stabilizing resistor 56 to the negative terminal 57 of the battery 52. Operating voltage is provided for the collector 38 by connecting the positive terminal 59 of the battery 52 through a portion of the primary winding 42 to the collector 38.

The secondary winding 58 of the auto-transformer 44 feeds the amplified emergency signal to the rectifier stage 16 which provides a direct current signal for the subsequent amplifying stage 18. In the illustrated embodiment, the rectifier stage 16 includes a diode 60 connected in series with the parallel combination of a filter capacitor and a load resistor 63, the diode 60 being connected so as to pass the positive half of the signal and block the negative half.

The rectified signal from the rectifier stage 16, which is taken across the filter capacitor 62 and the resistor 63, is fed to the direct current amplifier stage 18 where the rectified signal is amplified sufficiently to operate the relay 20. The amplifier stage 18 includes an n-p-n transistor 64, the rectified signal being fed through a biasing resistor 66 to the base 68 of the transistor 64. The collector 70 of the transistor 64 is connected to the positive terminal 59 of the battery 52, and the emitter 72 is connected through a coil 74 of the relay 20 to the negative terminal 57 of the battery 52.

In the illustrated embodiment, the relay 20 is provided with four contacts 76, 78, 80 and 82. One contact 76 which is a normally open contact, is connected across the on-off switch 84 of the radio circuit 10 so that when the relay 20 is energized the on-off switch 84 is by-passed.

The second contact 78, which is of the double throw type, is connected into the input circuit 86 of the radio circuit 10 so that when the relay 20 is de-energized the radio circuit 10 operates normally, and when the relay 20 is energized the input circuit 86 is tuned to the emergency wave length. As shown in FIGURE 1, the normally closed contact 89 of the second contact 78 connects the standard tuning capacitor 88 across the input transformer 90 of the radio circuit 10. The normally open contact 91 of the second contact 78 connects a tuning capacitor 92 across the input transformer 90. The tuning capacitor 92 is of such a value as to tune the transformer 90 to the emergency wave length.

The third contact 80, which is of the double throw type, is connected into the tank circuit 94 of the local oscillator of the radio circuit 10 so that when the relay 20 is de-energized the radio circuit 10 operates normally, and when the relay 20 is energized the local oscillator is tuned to a frequency equal to the emergency wave length less the intermediate frequency of the radio circuit 10. The normally closed contact 95 of the third contact 80 is connected in series with the standard tuning capacitors 96 of the local oscillator, and the normally open contact 97 connects a tuning capacitor 98 into the tank circuit 94. The tuning capacitor 98 is of such a value as to tune the local oscillator to the emergency frequency minus the intermediate frequency.

The fourth contact 82, which is also of the double throw type, is connected to the volume control 100 of the radio circuit 10 so that when the relay 20 is de-energized the volume of the radio circuit 10 is under the control of the volume control 100, and when the relay 20 is energized the volume of the radio circuit 10 is at a maximum. The normally closed contact 101 of the fourth contact 82 is connected in series with the wiper arm of the volume control 100 and the grid of the audio-amplifier. The normally open contact 102 is connected between the maximum volume side of the volume control 100 and the grid of the audio-amplifier.

In operation, when an emergency broadcasting station transmits an emergency signal, it is received by the remote control circuit where it is amplified, rectified, and in turn, the rectified signal is further amplified to operate the relay 20. Operation of the relay 20 results in the activation of the radio circuit 10, in case the radio circuit 10 is not in operation, the tuning of the radio circuit to the wave length of the emergency signal, and the switching of the volume in the radio circuit 10 to a maximum.

By connecting the remote control circuit to the radio circuit as described above, it is assured that all persons in the vicinity of the radio will hear the emergency message whether the radio was previously on or off. Moreover, if previous to the emergency signal the radio had been in operation and tuned to a standard broadcasting wave length, by the present invention the radio would be tuned automatically to the emergency wave length.

As soon as the emergency broadcasting station ceases to transmit, the relay 20 will become de-energized and the radio will resume its standard operation. Of course, a latching-type relay may be used, in which case the radio would remain in its emergency position until the latching relay is unlatched.

It should be realized that the emergency remote control circuit may be connected to other communication circuits besides a radio, such as a television receiver, short wave receiver, etc.

FIGURE 2 shows an emergency remote control circuit which may be used in connection with a radio circuit when the emergency signal is to be transmitted over a standard broadcasting wave length. The control circuit is connected into a radio circuit in a similar manner to the way in which the control circuit previously described is connected. The parts of the circuit shown in FIGURE 1 that are similar to the parts of the previously described remote circuit are indicated with the same reference numerals and the subscript "*a*."

When an emergency arises, the broadcasting station which is designated as the emergency station transmits a carrier wave modulated with an audio signal of a preselected frequency. The control circuit shown in FIGURE 2 is designed to operate a relay 20*a* when the audio signal is received for a preselected time interval.

The input amplifier stage 12*a* of the circuit shown in FIGURE 2 is the same as the input amplifier stage 12 of the previously described control circuit. The output from the amplifier stage 12*a* is fed through a detector stage 106 which includes a diode 108, in series with the parallel combination of a load resistor 110 and a by-pass condenser 112.

The output from the detector stage 106 is amplified by a direct current amplifier 114 which includes a grounded emitter p-n-p type transistor 116. The base 118 of the transistor 116 is coupled to the load resistor 110 of the detector stage 106 through a coupling capacitor 120.

Bias is provided for the base 118 of the transistor 116 by a voltage divider connected across the battery 52*a*, the voltage divider including a pair of series connected resistors 124 and 126. The emitter 128 of the transistor 116 is connected through a stabilizing resistor 130 to the positive terminal 59*a* of the battery 52*a*. The emitter resistor 130 is by-passed to ground by a capacitor 132. The collector 134 of the transistor 116 is connected to a band pass filter 136 which is tuned so as to allow only the audio signal to be passed therethrough. In the illustrated embodiment, the band pass filter 136 includes a T-section 140 of three resistors 141 in parallel with a T-section 142 of three capacitors 143.

The audio signal passed by the filter 136 is fed through a diode rectifier 144 to an integrating circuit 146 which includes a variable resistor 148 in series with a capacitor 150. The variable resistor 148 is adjusted to a value which will allow the capacitor 150 to charge up to a voltage which is sufficient to operate the relay 20 if the audio signal is transmitted for the preselected time interval.

In the illustrated embodiment, the output from the integrating circuit 146, which is taken across the capacitor 150, is connected to a direct current amplifier 18*a*, which in turn is connected to the relay 20*a*. The amplifier 18*a* and the relay 20*a* are respectively the same as the direct current amplifier 18 and the relay 20 previously described in connection with FIGURE 1. Preferably, with the circuit shown in FIGURE 2, a latch type relay should be used, since the preselected audio signal ceases when messages are transmitted over the emergency wave length.

In operation, when a national emergency arises, the emergency broadcasting station transmits a carrier signal which is modulated with an audio-frequency of a preselected wave length for a preselected length of time. When the audio-signal is received for this length of time, the relay in the control circuit is actuated to thereby activate the radio, tune the radio to the emergency frequency, and switch the volume of the radio to a maximum.

Various changes may be made in the above described emergency remote control circuit without departing from the spirit or scope of this invention.

Various features of the invention are set forth in the accompanying claims.

I claim:

1. In a communication receiver circuit, means for activating and tuning said receiver circuit in response to a carrier signal modulated with an audio signal comprising an amplifier tuned to the frequency of the carrier signal, a detector connected to the output of the amplifier, a band pass filter connected to the output of the detector, a rectifier connected to the output of the band pass filter, an integrating circuit connected to the output of the rectifier, a direct current amplifier connected to the output of the integrating circuit, and a relay connected to the output of the direct current amplifier, said relay having four contacts, one contact being connected so as to short-circuit the on-off switch of said receiver circuit when the relay is energized, a first tuning means for tuning the local oscillator tuning circuit to the frequency of the carrier signal minus the intermediate frequency of the receiver circuit, a second tuning means for tuning the input circuit to the carrier signal, the second contact connecting said first tuning means into the local oscillator tuning circuit so as to tune the local oscillator of said receiver circuit to the frequency of the carrier signal minus the intermediate frequency of the radio circuit when said relay is energized, the third contact connecting said second tuning means into the input circuit so as to tune the input stage of said receiver circuit to the frequency of the carrier signal when said relay is energized, and a fourth contact being connected to the volume control of said receiver circuit so as to switch the volume to a maximum when the relay is energized.

2. In a communication receiver circuit, means for activating and tuning said receiver circuit in response to a signal, comprising an amplifier tuned to the frequency of the signal, a rectifier connected to said amplifier, a direct current amplifier connected to the output of said rectifier, and a relay connected to the output of said direct current amplifier, said relay having four contacts, one contact being connected across the on-off switch of the receiver circuit so as to short-circuit the on-off switch when the relay is energized, a capacitor of sufficient capacity to tune the local oscillator of the receiver circuit to the frequency of the signal minus the intermediate frequency of the receiver circuit, the second contact disconnecting the tuning capacitor of the local oscillator and connecting said capacitor into the local oscillator circuit when the relay is energized, a second capacitor of sufficient capacity to tune the input stage of the receiver circuit to the frequency of the signal, the third contact disconnecting the tuning capacitors of the input stage and connecting said second capacitor into the input stage when the relay is energized, the fourth contact being connected to the volume control of said receiver circuit so as to switch the volume to a maximum when the relay is energized.

References Cited in the file of this patent

UNITED STATES PATENTS

| | | |
|---|---|---|
| 2,330,241 | Roberts | Sept. 28, 1943 |
| 2,841,700 | Hallden | July 1, 1958 |
| 2,879,383 | Powell | Mar. 24, 1959 |

FOREIGN PATENTS

| | | |
|---|---|---|
| 513,163 | Great Britain | Oct. 5, 1939 |